United States Patent [19]

Renken et al.

[11] Patent Number: 4,542,650

[45] Date of Patent: Sep. 24, 1985

[54] THERMAL MASS FLOW METER

[75] Inventors: Wayne G. Renken, San Jose; Dan B. LeMay, Palos Verdes Estates, both of Calif.

[73] Assignee: Innovus, Fremont, Calif.

[21] Appl. No.: 526,860

[22] Filed: Aug. 26, 1983

[51] Int. Cl.[4] .................................................. G01F 1/68
[52] U.S. Cl. ...................................... 73/204; 338/319
[58] Field of Search ..................... 73/23, 204; 357/25, 357/55; 338/25, 318, 319

[56] References Cited

U.S. PATENT DOCUMENTS

| | | | |
|---|---|---|---|
| 3,996,799 | 12/1976 | van Putten | 73/204 |
| 4,343,768 | 8/1982 | Kimura | 338/34 X |
| 4,471,674 | 9/1984 | Jerman et al. | 73/23 |
| 4,478,076 | 10/1984 | Bohrer | 73/204 |
| 4,478,077 | 10/1984 | Bohrer et al. | 73/204 |

Primary Examiner—Herbert Goldstein
Attorney, Agent, or Firm—Thomas S. MacDonald; Alan H. MacPherson; Steven F. Caserza

[57] ABSTRACT

The flow meter (10), particularly useful in monitoring flow in semiconductor manufacturing operations, measures mass flow rate of fluids and is fabricated by providing spaced webs (16) deposited on a silicon substrate (11) and fluid flow grooves (13) etched across a substrate surface and extending under the spaced webs. The webs 16 include a low thermal conductivity layer deposited in spaced aligned portions of the substrate and electrically resistive pathways deposited on the layer portions (61). The webs act as temperature sensors and/or heaters. Heat is added to the flowing fluid and a differential temperature is measured on a bridge circuit as is known in the art to measure flow rate. A cover (12) has etched grooves (14a) which match the grooves (13) of the substrate to form a fluid passageway in which the web bisects the passageway forming an "air-foil" like bridging member extending completely across (or cantilevered across) in transverse relation to the flat sides of the substrate on either side of the groove. Normally multiple series of webs and multiple grooves are employed to provide redundancy of the flow meter channels in the event contaminants plug a particular channel.

20 Claims, 10 Drawing Figures

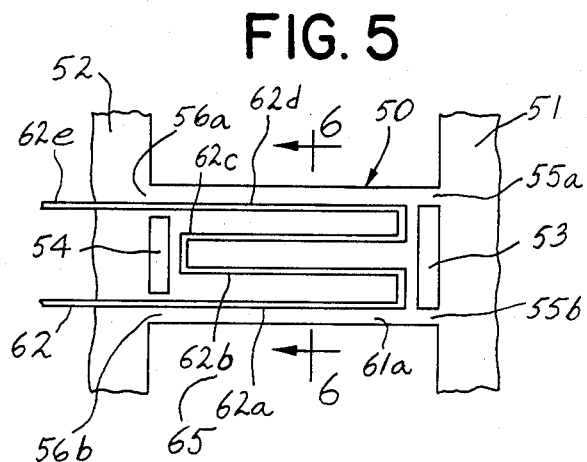
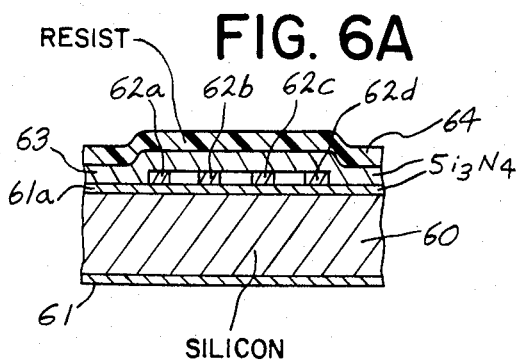
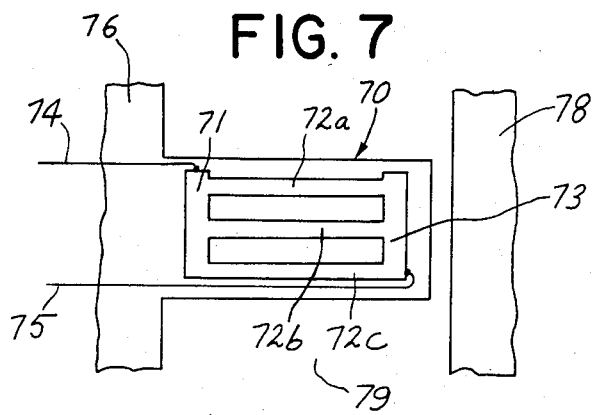
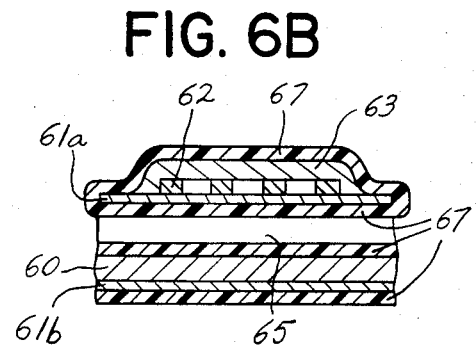
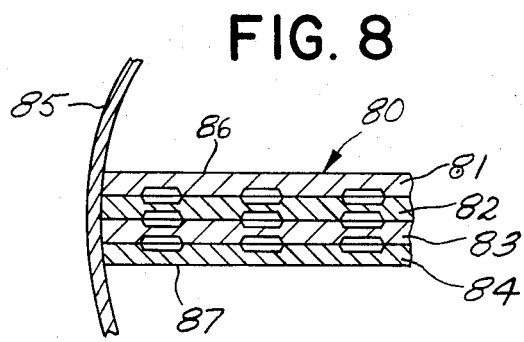
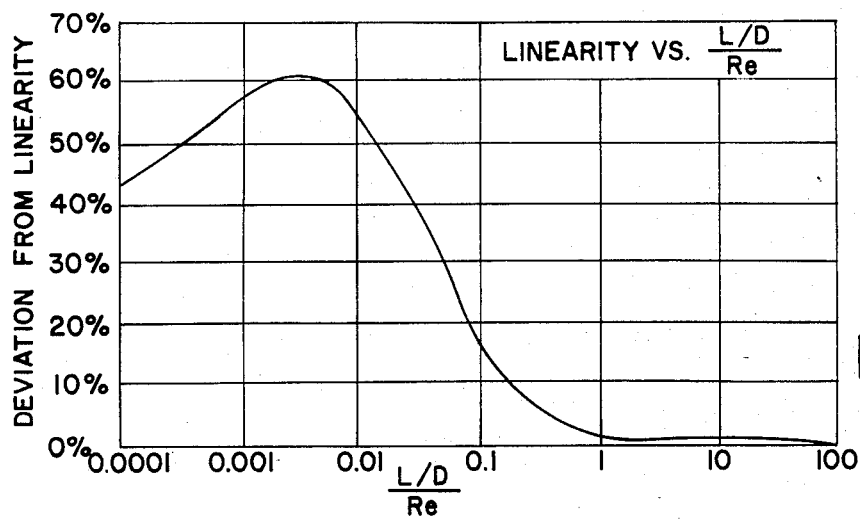

THERMAL MASS FLOW METER

BACKGROUND OF THE INVENTION

1. Field of the Invention

This invention relates to a thermal mass flow meter including sensors capable of measuring the mass flow rate of liquid or gaseous fluids. A thermal mass flow sensor operates by adding heat and measuring a heat transfer function that is dependent upon the mass flow rate of the fluid through the sensor. Known configurations include 1-, 2- and 3-element types. An example of the 1-element type is the well known hot wire anemometer. The 2-element configuration has one element upstream of the other. Both elements are heated by electric power and cooled by the fluid. The upstream element is cooled by the flow more than the downstream element and the measured temperature difference is a function of fluid mass flow rate. The 3-element configuration has a heated element situated between upstream and downstream temperature-sensing elements. Again, the temperature difference is the measure of flow. We are concerned herein only with 2- and 3- element types.

2. Prior Art

A number of thermal mass flow sensor arrangements have been developed over the past many years. Basically, these have operated on the principle of adding heat energy to a flowing fluid and measuring a heat transfer function and or thermal mass transport function in two sensors spaced in the flowing fluid or on a passageway wall. The measured temperature difference between the upstream and downstream sensors is a function of fluid mass flow. The specific nature of the relationship between mass flow rate and temperature difference is complex, and depends upon fluid properties as well as sensor geometry. The design variables include: sensor style (2- or 3-element); sizes and shapes of heat transfer surfaces; solid thermal conductivities such as those from element-to-element, and from element-to-wall; and flow passage geometry affecting local velocities over the heat transfer surfaces. Fluid properties affecting the flow signal include those dependent upon composition (viscosity, conductivity, specific heat, etc.) but not those dependent upon state (temperature, pressure) because the device is intended to measure mass flow rate independent of state.

An early version of Thomas for large flow applications employed a flow pipe of multi-inch diameter in which two spaced sensor loops were inserted through ports into a circular flow channel with a separate heating element therebetween forming a three-element device. The sensors were made of a material such as platinum, nickel or nichrome which had a temperature-dependent electrical resistivity which varied over a moderate temperature range. When the fluid at one temperature having passed by the first upstream sensor is then heated to a higher temperature, the resistivity of the downstream second sensor is changed, the measured temperature difference between the sensors being the measure of flow. The temperature rise in the gas is a function of the amount of heat added, the sensor geometry and conductivity, the mass flow rate and the properties of the gas.

More recently, a two-element mass flow meter and controller has been developed by Tylan Corp. of Carson, Calif. in which a pair of equally heated upstream and downstream resistance sensors made of Nichrome wire are externally wound around a sensor flow tube. When fluid (gas) is flowing in the tube, heat is transferred along the line of flow from the upstream to downstream thermometers/sensors producing a signal proportional to the gas flow. The higher the flow, the greater the differential between the sensors. Each sensor forms part of a bridge and amplifier circuit that produces a zero to 5 V DC signal proportional to gas flow. This signal is compared to a command voltage from a potentiometer or the like and an error signal generated which can adjust a valve to change the gas flow until a preset set point is reached. The sensor flow tube is in this device approximately 0.010" ID × a length greater than 1" which will handle flow rates of only a few standard cc's per minute. Higher flow rates are accommodated by passing additional gas flow around the sensor through a flow splitter designed to maintain a constant and known bypass ratio.

A mass flow controller sold by Brooks Instruments, Hatfield, Pa., utilizes a horizontal bypass sensor tube with upstream and downstream sensor coils exterior of the tube and a heater element similarly wound between the sensors on the tube exterior. A bridge detects the temperature difference caused by the greater heat input to the downstream sensor and an amplifier provides an output to control circuitry. The sensor tubes have an internal diameter of from 0.010" to 0.060" inches. In each of the last two devices, heat conduction is through the tube wall resulting in relatively slow long response times, i.e., several seconds. Such devices also generally require heating of the fluid to 100°–200° C. greater than the ambient of the incoming fluid to give satisfactory performance. In many gaseous applications, this may be above the safe temperature limit of the gas or cause decomposition of the gas or reaction with contaminants. Further, for each gas composition and flow range, the device must be calibrated because of nonlinearities and inconsistent correction factors.

SUMMARY OF THE INVENTION

The present invention is directed to a thermal mass flow meter in which the heat sensors and heater of either the two-element or three-element configuration are formed in-situ on an integral member bridging across or extending within a channel of a substrate. The bridging member is formed by a deposition and etching method followed by etching a series of channel grooves in a substrate to form the flow passages. The sensors and heating members are deposited on the bridging members which are in thermal contact with the fluid stream. In the preferred embodiment, the bridging member bisects a flow path structure formed by the channel-containing substrate and a matching channel-containing cover. Redundancy is provided by employing multiple channels in the substrate/cover or additionally in providing a series of stacked substrates/covers. The invention also contemplates having a passive flow path in an overall flow conduit into which a substrate/cover or substrate/substrate assemblies are placed so that only a sample portion of the fluid passes through the active substrate channels.

More particularly, the invention is directed to a flow meter of fast response time having relatively small flow passageways containing internal sensors in highly redundant configurations capable of accurate measurement even in relatively low fluid flow ranges. The flow sensors and passageways are preferably made by utilization of silicon substrates, micro-etching and film deposition techniques. They find particular utility in gas flow systems in semiconductor equipment for chemical vapor deposition, thermal oxidation and plasma etching of semiconductor wafers.

The mass flow meter configurations of this invention summarized above provide a highly accurate measurement of flow rates with adequate sensitivity even over very low flow ranges of about 0.2 to 10 standard cc/minute (SCCM). Larger flow rates may be provided for by paralleling the necessary number of channels. For example, a 5000 SCCM unit may be made by paralleling 500 sensors of a 10 SCCM capacity each. Thus, it is not necessary to separately optimize thermal and mechanical design for a variety of sensor sizes, thus saving costs. Further, larger sizes have slower response times and heater power input would be excessive at high flows. This invention thus provides paralleled sensors, all with identical flow $\Delta P$ characteristics and with each carrying the same fraction of total flow, thus providing ideal flow splitting and sampling. With these mass-produced and inexpensive sensor elements a high-flow unit is provided with multiple sensors which with suitable checking logic provides failure detection and redundancy.

The construction of the bridging members is such as to insure substantial thermal isolation of the fluid temperature sensors and heaters deposited thereon from other structures within the overall flow conduit. This is accomplished by reducing the bridging members cross-sectional area at or near its connection with the substrate and fabrication of the bridging members from low thermal conductivity materials such as silicon dioxide or silicon nitride deposited on a silicon substrate. The sensors and heaters themselves normally fabricated of nickel or refractory metals are deposited on the bridging members. Suitable interconnects are added by film deposition techniques, and a passivating nonreactive film deposited over all surfaces in contact with the measured fluid. Effects of external natural heat convection are substantially eliminated by locating the heater internally in the fluid channel. The resultant device thus has reduced attitude sensitivity.

Multiple sensor outputs are compared with each other over time to detect changes in their relative output ratios and sense calibration shifts. Accurate flow measurement can continue by disregarding low output sensors (caused by plugging), and relying on the high output sensors which have maintained their original output ratios. Fluid flow characteristics between sensor flow passages and bypass flow passages are matched by maintaining a specific value of $$\frac{L/D}{Re}$$

for all flow passages or using a $$\frac{L/D}{Re}$$

of 1.0 or above to assure sampling accuracy over a wide range of temperatures, pressures, and gas compositions. L/D is the length over diameter ratio. Re is the flow passage Reynolds number. The $$\frac{L/D}{Re}$$

ratio is indicative of the relative importance of the linear laminar flow pressure drop compared with the nonlinear entrance and exit losses.

Flow measurement errors due to environmental temperature gradients are reduced through the use of a substrate with high thermal conductivity, which maintains a uniform flow passage wall temperature within a sensor flow passage and between flow passages. Higher heat transfer efficiency to the measured fluid and a lower sensor element mass, produces much faster response times than sensors with wire elements wrapped externally on sensor tubes. Higher heat transfer efficiency reduces sensor response time and minimizes the influence of environmental temperature gradients.

The above attributes of this invention allow its use in batch or continuous processing operations in the semiconductor industry wherein deposition of various materials by chemical vapor deposition or the etching of substrates or wafers necessitates very accurate control over small liquid or gaseous flow rates. The fluids to be measured may be highly reactive. Many individually controlled delivery points may be needed to achieve uniform processing of individual wafers. Some processing times are very short—measured in seconds—and thus flow measuring systems must have short stabilization times and fast response times. The present invention gives fast response times because of the improved heat transfer and orders of magnitude lower thermal mass of the web or bridging member than a metal sensing tube with external coils. Response times of several milliseconds as compared to several seconds in the prior art are contemplated.

The heat sources and sensors are in intimate contact with the gas stream resulting in higher efficiency and lower operating temperature. The device can effectively operate with as small as 25° C. $\Delta$ temperature differential while many prior art devices have a differential of from 100°–200° C. Due to the small size of a typical embodiment of the improved flow meter, e.g., 1 in$^3$, the overall process equipment system size may be reduced. Prior art devices of which we are aware range from 16–66 in$^3$.

BRIEF DESCRIPTION OF THE DRAWINGS

FIG. 5 is a blown-up plan view of a typical sensor deposited on a substrate web.

FIG. 6A is a partial cross-sectional view taken on the line 6—6 of FIG. 5 of a sensor mounted on a substrate prior to channel etching.

FIG. 6B is a partial cross-sectional view taken on the line 6—6 of FIG. 5 of a sensor mounted on a substrate after channel etching.

FIG. 7 is a plan view of an alternative embodiment of a cantilevered bridging member or web.

FIG. 8 is a partial cross-sectional view of a further embodiment of the invention showing a series of flow meter substrates forming a redundant array within a fluid conduit.

FIG. 9 is a graph showing the deviation of flow from linear characteristics as a function of the ratio of the length/diameter of the flow passage(s) to the flow passage Reynolds number.

DETAILED DESCRIPTION OF THE DRAWINGS

Figure 1:
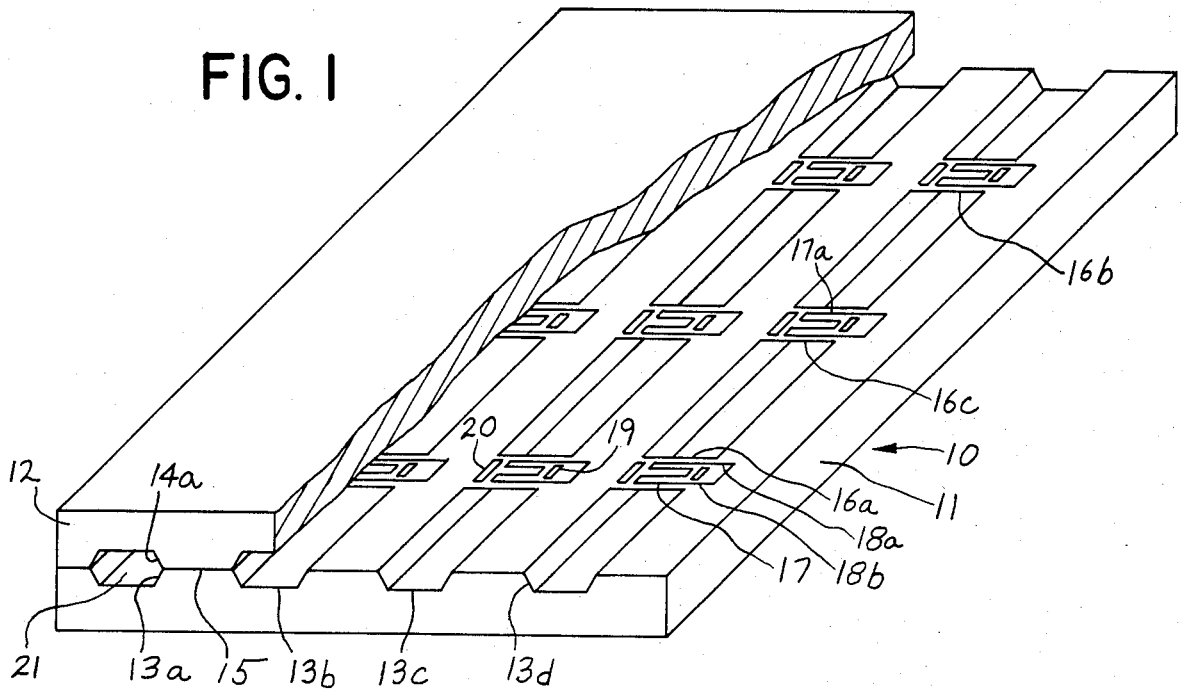
FIG. 1 is an isomeric cutaway partial view of the mass flow meter sensor and heating structure.
Figure 2:
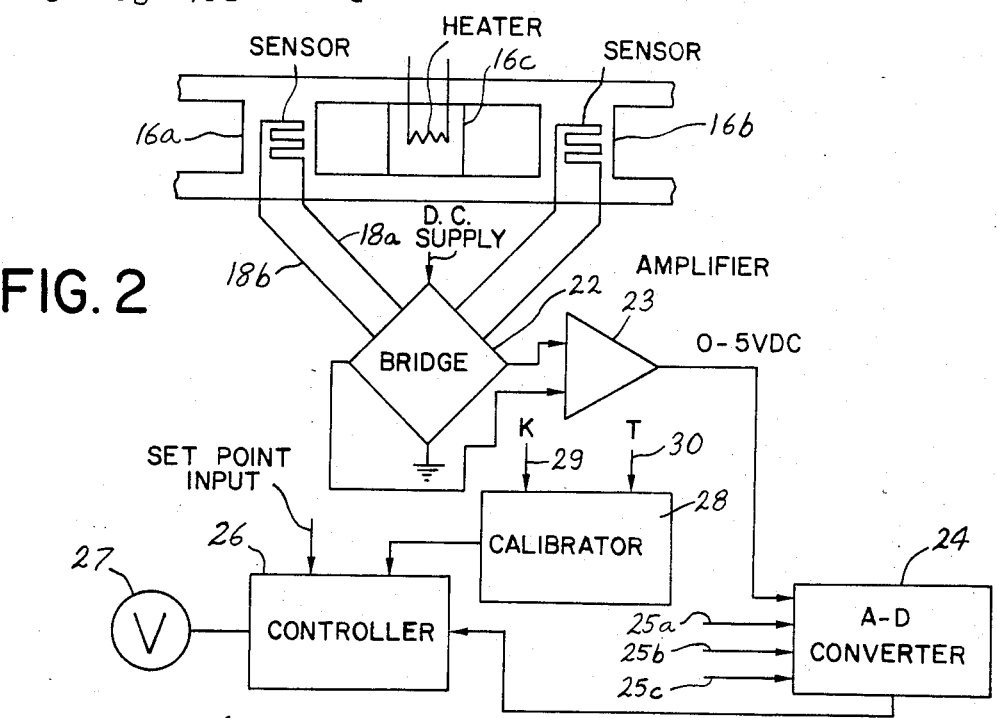
FIG. 2 is a circuit schematic and block diagram of the flow meter and a flow controller.

FIG. 1 illustrates the flow meter 10 of this invention which includes a substrate having a first substrate panel or element 11 containing a series of grooves 13a–d extending longitudinal thereof and a cover plate or second element 12 having a corresponding set of grooves 14a etc. which form, upon assembly and frit bonding with substrate panel 11, a fluid passageway 21. Longitudinal portions of the panel 11 and plate 12 between the grooves abut as at 15 so that adjoining grooves, e.g., 13a and 13b, are sealed from each other. A pair of bridging members or webs 16a (upstream) and 16b (downstream) are formed across the top edge of panel 11 forming a sensor element extending at least partially across the grooves. As later explained in detail, the web may be of low heat and electrical conductivity material such as silicon nitride or silicon oxide with a high thermal coefficient of resistance material such as nickel deposited on the web to form a temperature sensing pattern 17 on its surface. "Low heat conductivity" as used herein means a conductivity lower than about 0.15 watts/cm/°C. Suitable electrical interconnect patterns 18a, 18b extend from the sensor pattern to a temperature-sensing bridge circuit (FIG. 2). Midway of upstream sensor 16a and downstream sensor 16b is a third web 16c containing a high resistivity pattern 17a functioning as a resistance heater. In operation, heater 17a differentially heats upstream sensor 16a and downstream sensor 16b as fluid is conveyed in passage 21 from sensor 16a to sensor 16b. Each of the webs 16a–c are rectangularly apertured as at 19, 20 adjacent their connection with the flat surfaces 15 between the grooves to reduce the cross-sectional area at the attach point and limit heat conductivity from the sensor and web to the substrate panel 11. In the preferred embodiment, each of the webs 16a–c effectively bisects the passageway 21 formed by the facing grooves 13a–14a, etc.

In a typical embodiment, a 0.3"×0.3"×0.020 mil silicon chip is provided with six grooves, each with three webs—two containing temperature sensors and an intermediate web containing an electrically powered resistance heater. The channels in panel 11 and cover 12 have a depth of about 2.8 mils so that the height of the passageway 21 is about 5.6 mils. Width of the channel is about 23 mils. The webs are about 23 mils in width across the channel, are about 3 microns in height and extend 7 mils along the channel length. The webs are spaced apart 35 mils center-to-center. The channels are spaced apart 43 mils center-to-center.

FIG. 2 illustrates a controller circuit usable with the above-described sensor. Interconnects carrying signals indicative of temperature due to the change in sensor resistivity resultant from the differential temperatures of the sensor patterns 17 imposed by the heater 17a on web 16c are connected to a conventional bridge circuit 22. Circuit 22 interprets the temperature difference and sends a difference signal to an amplifier 23 which outputs to control circuitry 26 through an analog-to-digital converter 24. Additional inputs 25a–c from other groups of sensors in other channels may be connected to converter 24 to provide a redundancy of flow readings. Controller 26 has a set point input which, when compared to the input from converter 24, operates a fluid flow control valve 27 to adjust fluid flow in the fluid conduit and channel(s) to that set point.

Small sensor flow passages are sensitive to particle contamination which can shift calibration. Fabricating many flow sensors in a single substrate allows economic sensor redundancy. By independently mointoring each flow sensor channel in a series of parallel connected channels, it is possible to compare the relative output of each sensor combination in a channel. A decrease in output of a specific sensor combination in a channel relative to the other channels indicates the low output sensor channel has probably been contaminated or partially plugged with particulate contamination.

The control circuit 26 determines if the original (uncontaminated) flow ratios are maintained and if so, averages the readings of all sensor groups. If the relative flow ratios change, the lower indicating sensor group readings are disregarded and only the higher readings from those channels which have maintained the original ratio are depended upon to indicate flow. An alarm signal indicating contamination is generated if the original ratio is not maintained.

A proportional/integral/derivative control algorithm is used to servo the downstream valve and control it to the flow set point. In prior art devices, individual calibration is needed to adjust the controller linearity and output specifically for each sensor-bypass combination and a specific gas composition. In this invention it has been found that by maintaining closely the fluid flow characteristics for both the active sensor flow passages and passive bypass passages (FIG. 3) sampling accuracy is retained over a wide range of temperatures, pressures and gas composition.

The calibrator 28 includes a microprocessor which plots and stores calibration table data in a programmable read-only memory (PROM) and includes a matrix of data points to correct for minor sensor nonlinearity for the gases being flowed. Conversion constants for other gases are placed in the Table and the computer will automatically adjust the amplifier gain when other gases are selected.

Since the sensor sampling accuracy and linearity is maintained, the output signal level can be scaled from one gas to another or to mixtures of gases by a sensor amplifier scale factor. The flow, when scaled, will alter the full scale range and result in changed values of sensor ΔP and valve ΔP at maximum flow. If this ΔP is excessive for external reasons, then the full scale range rating would have to be reduced from the flow rate achievable by sensor linearity considerations above. For the same linearity at maximum flow, $$\left(\frac{L/D}{Re}\right) \text{min.} = \text{same } (Re) \text{ max}$$

$$= \text{same } \frac{(\rho_s Q_s)}{\mu} \text{ max}$$

$$(Q_s) \text{ max} \propto \frac{\mu}{\rho_s}$$

Where $\rho_s$ is the density under standard conditions and $Q_s$ is the flow rate in standard cc per minute and $\mu$ is the viscosity. The sensor pressure drop varies with flow and viscosity, i.e., $$\Delta P \propto \mu Q_s$$

$$\Delta P \propto \frac{\mu^2}{\rho_s} \text{ (Sensor)}$$

The valve wide-open pressure drop is a nonlinear function of flow because of the density increase at higher $\Delta P$. However, at low $\Delta P$, the approximate variation is:

$$\Delta P \propto \rho_s Q_s^2 \text{ (approximate)}$$

so that at the new sensor flow:

$$\Delta P \propto \frac{\mu^2}{\rho_s} \text{ (valve)}$$

The above relationship is slightly conservative; i.e., at higher valve pressure drop the actual value would be slightly less than calculated. Since the pressure drop scaling of the sensor and valve is the same in terms of viscosity and density, the total pressure drop may be scaled by the same factor.

VALVE CONTROL

Valve control in the complete flow control system is independent of the sensor control described earlier. The sensor and its related regulator or control is considered to be an independent flow transducer. The flow control circuit compares the measured flow signal with an input command and acts to null the difference by manipulating a valve situated in series with the sensors in the flow stream. As is known, the dynamic control algorithm will be optimized to give the best response and steady state accuracy of control, and will be dependent upon the dynamic characteristics of the sensors and valve.

Figure 3:
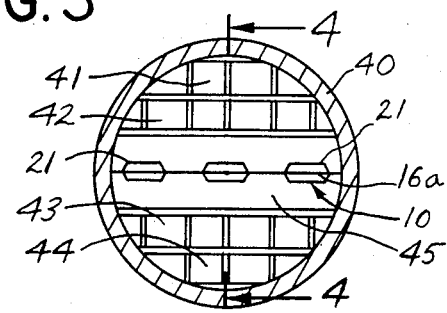
FIG. 3 is a cross-sectional view of a mass flow meter integrated with a fluid bypass in a fluid conduit.

FIG. 3 shows a flow meter 10 as part of a flow tube bypass system. A flow conduit 40 typically of stainless steel includes passive bypass passages 41–44 and a flow-splitting flow meter 10 laterally extending across and centrally mounted in the conduit. The active sensor passages 21 in two-part substrate 45 sample a portion of the total flow through all passages inside the wall of conduit 40. Passages represented by 44–44 are bounded by egg-crate like baffles or walls extending the length of the sensor 10 and form passive fluid flow paths. Maintaining a value of $$\frac{L/D}{Re} \geqq 1.0$$

for all active sensor and passive bypass flow passages assures a constant and linear flow split.

L/D is the effective length/diameter ratio of the flow passage (for either a sensor containing passage or bypass). D is the hydraulic diameter $$\left(4 \times \frac{\text{area}}{\text{perimeter}}\right)$$

(if the passage is not a circular cross-section). Re is the Reynold's number of flow in the passage. If $$\frac{L/D}{Re}$$

becomes too small (much below 1.0) the flow vs. $\Delta P$ curve departs from linear (laminar) because of entrance and exit loss effects.

If the flow $\Delta P$ curve is linear then sensor flow is a constant fraction of total flow (sensor plus bypass). With different gases the scaling factor may change, but linearity is not changed as long as the combination of gas properties and maximum flow rate does not drive $$\frac{L/D}{Re}$$

too low.

If $$\frac{L/D}{Re}$$

is too low, the flow is not linear with pressure drop and nonlinearity will change with pressure, temperature and gas properties. The sensor and bypass would then be required to be of identical length and diameter to maintain constant flow split. Otherwise differences in $$\frac{L/D}{Re}$$

would result in different linearity deviations, such that the calibration would change with gas properties and state. The deviation from linear characteristics is shown in FIG. 9.

Figure 4:
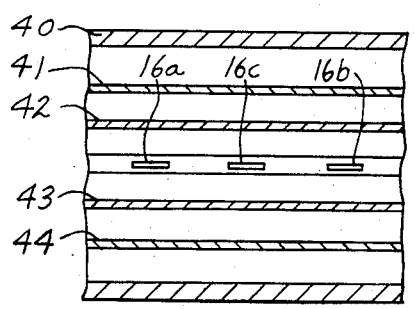
FIG. 4 is a longitudinal cross-sectional view of the flowmeter and conduit taken on the line 4—4 in FIG. 3.

As can be seen in FIG. 4, the webs 16a–c act as a vane or air foil in an airstream. The web has a thickness in one embodiment of 1–7 microns. The aerodynamic force is such that a small deviation from null angle of attack creates an unbalanced force tending to increase the angle of attack. If the rate of change of the aerodynamic force with angle is greater than the rate of change of mechanical resistance with deflection (i.e.; the spring rate) then the angle increases until stall occurs. At that point the aerodynamic force is reduced, the vane returns to lower angle of attack, stall recovery ensues, and the process repeated. This cycle, which repeats rapidly, is called flutter.

This potential problem in the webs may be solved by making the torsional stiffness of the airfoil-like web and its support great enough to prevent flutter or by positioning the airfoil's flexural pivot point ahead of the airfoil center of pressure (25% chord point) so that the response is in the self-correcting rather than self-exciting direction. Calculations of the present design show that the support stiffness can be made large enough to prevent flutter, but that this portion of the design does require a compromise to be made with thermal isolation from the walls. Based on the worst condition (maximum inlet pressure and density, no downstream restriction) the design with adequate stiffness has a thermal conductivity which is not negligible, but can be tolerated. The compromise is improved if the flexural pivot is moved toward the vane leading edge by making the supports unsymmetrical.

FIG. 5 more clearly illustrates the details of a typical sensor or heater 50. Web 61a bridges across substrate flats 51 and 52 on either side of longitudinal channel 65. Rectangular apertures 53, 54 are cut out by etching or the like at the connection areas of web 61a to the flats 51, 52, leaving connections 55a, 55b and 56a, 56b of low cross-sectional area. This aids in preventing flow of heat flux from the web to the substrate itself. The surface of web 61a contains a pattern of reverse bends 62a–62d of high temperature coefficient of resistance material such as nickel or chromium, on its surface forming the temperature sensors or heater.

FIG. 6A is a cross-sectional view of the web on the line 6—6 showing a silicon substrate 60, a silicon nitride (or silicon oxide) deposited layer forming the bridging member or web 61a, the resistive pattern 62a–d, a further overlay of silicon nitride (or silicon oxide) 63 and a resist layer 64 which protects the web from the subsequent etching step(s). FIG. 6B illustrates the final form of the web 61a and patterned sensor 62a–d, the passivation-nonreactive film of silicon nitride coating 63 thereover and an additional passivation nonreactive film layer 67 of silicon nitride, Paralyne, trifluorochloroethylene (Teflon), polyimides, silicon dioxide or the like to protect the web and substrate from reactants being conveyed through the flow meter. As a result of conventional etching step(s) groove 65 extends longitudinally of the substrate under the webs. The webs thus bisects the passageway formed by the matching substrate and cover grooves.

A typical fabrication sequence for a single-etched flow path silicon substrate with a single groove, dual sensors and frit seal between the substrate and cover is as follows: A 5000 Å layer of $SiO_2$ is thermally oxidized on the substrate. Photoresist is applied to all sides, the resist is exposed and developed utilizing a mask for recessing the web and interconnect paths*. The oxide mask is etched, resist is stripped and the silicon is etched 5 microns deep (isotropic). A 2000 Å layer of $Si_3N_4$ is deposited by chemical vapor deposition (CVD), photoresist applied, exposed using a top side via mask and developed*, the mask area is etched*, resist is stripped, a topside contact pit is anisotropically etched 2.5–3 mil deep, $Si_3N_4$ is stripped if necessary, CVD $Si_3N_4$, apply photoresist to back side and mask front, expose a backside via trench and develop resist*, etch mask*, strip resist, etch bottom trenches through to the topside contact pit approximately 18.5 mils deep*, strip $Si_3N_4$, oxidize 30,000 Å silicon to silicon oxide, clean, deposit nickel front and back, apply resist to front and mask back, expose and develop front interconnect and resistor mask*, etch front nickel, strip resist, apply resist, expose web and groove mask, develop resist, etch $SiO_2$*, etch silicon 2.8 mils deep, apply photoresist to back side, expose rear interconnect mask, develop resist*, etch nickel*, strip resist, deposit silicon nitride, apply resist to back side and mask front side, expose open rear contact mask, develop resist*, etch nitride to open nickel bonding pads and strip resist*. The notation "*" indicates an inspection step. Resists, etchants, reactants and detailed fabrication techniques are those commonly used in the semiconductor manufacturing art. The above sequence of steps results in a flow meter construction shown in FIG. 6B with electrical contacts on the rear side (opposite the cover-facing side) with thin film nickel leads extending thereto from the sensor patterns. The leads pass through vias selectively etched through the silicon wafer.

FIG. 7 shows an alternative embodiment of the sensor used. Web 70 is cantilevered from one flat 76 extending on the side of etched groove 79 out over the groove to a position where its free end is spaced about 3 mils from the parallel flat 78. In this embodiment the sensor resistors are shown in parallel having opposed spaced resistive bus bars 71, 73, resistive elements 72a, b, c therebetween and leads 74, 75 extend from opposite ends of the bus bars which are connected by the vias (contact windows) and interconnect leads to contact pads connected to the bridge circuit (FIG. 2). The resistive path shown in FIGS. 5 and 7 may serve also as an integral heating element while also additionally functioning as a temperature sensor in a two-element flowmeter design.

FIG. 8 shows a stacked version of the flow meter suitable for handling larger flow rates. In this mode, inner substrates 82 and 83 may contain webs and grooves on one side and web-less grooves on the other which co-act as a cover with its abutting substrate. A FIG. 1-type substrate bottom grooved cover 81 with flat top 86 is used abutting the webbed-grooved top of substrate 82 and a substrate 84 having a webbed-groove top surface used to abut the groove-only bottom surface of substrate 83. Substrate 84 has a flat grooveless bottom surface 87. Any number of grooves across the substrate may be provided dependent on the desired flow range, redundancy desired and the conduit 85 diameter. Likewise, additional etched substrates forming a layer substrate "sandwich" may be stacked one on another with suitable matching channels.

While the invention has been described in terms of a silicon substrate, other crystalline or non-crystalline materials such as silicon dioxide, sapphire or metals such as nickel, monel or stainless steel may be employed as the substrate or cover. Also, while the web has been shown at the top level of the substrate, it may be formed at an intermediate level in the substrate and an ungrooved cover plate utilized to close the overall fluid passageway. A "web" as used herein means a deposited support layer and resistive pathway with or without its associate protective layer. The web may be the channel bridging member as shown, or may extend upwardly pedestal-like from a wall surface such as the channel bottom or may be formed on a channel wall inner surface as a laid down layer thermally isolated from the substrate such as by undercutting the web area.

In the preferred embodiment when the web bisects the active flow channel, the preferred thickness or weight of the web (perpendicular to the fluid flow path) is in the range of about 1 to about 7 microns. In this embodiment the web thickness preferably represents from about 1% to about 5% of the total height of the active flow channel.

Further, while the sensor control has been explained in terms of the temperature difference resultant from the flow of fluid from equally heated (in non-flow condition) sensors, control may be exercised in other ways. For example, heater power may be regulated independent of output temperature difference signal. Variations on this theme include automatic temperature compensation achievable by the proper selection of heater resistance temperature coefficient along with the corresponding appropriate regulated variable (voltage, current, power, or combination of these). Also, the temperature difference signal may be regulated by feedback control of the heater. The heater excitation (voltage or current) them becomes the output signal. Further, a variable schedule of the regulated parameter in either of the above schemes may be used as a function of other parameters (e.g. temperature or output signal level) to achieve compensation or linearization.

The above description of the advantages and the embodiments of this invention is intended to be illustrative only, and not limiting. Other embodiments of this invention will be apparent to those skilled in the art in view of the above disclosure.

We claim:

1. A thermal mass flow meter for fluids comprising a first substrate;
   a continuous elongated fluid-flow channel having side walls and a bottom extending on a surface of said first substrate from one edge of the first substrate to an opposed edge of the first substrate for conveying a fluid to be measured through said channel, said first substrate having at least two integral members spaced from each other and extending transversely across at least a portion of said channel and spaced from the channel bottom such that said fluid passes transversely of and under and over said members;
   means for forming a temperature sensor on each of said members; and;
   means on at least one of said members for heating said fluid to provide a temperature difference between said sensors when fluid is being conveyed.

2. The invention set forth in claim 1 in which said sensor means are resistive patterns extending on said members.

3. The invention set forth in claim 2 in which said integral members extend from one channel edge to another spaced channel edge transverse of said channel.

4. The invention set forth in claim 2 in which said integral members extends cantilevered from one channel edge transverse of said channel.

5. The invention as set forth in claim 1 including means forming a reduced cross-sectional area in said members for minimizing thermal conductivity from the members to said first substrate.

6. The invention as set forth in claim 5 in which said means forming a reduced cross-sectional area includes aperture means adjacent a connection between said members and said channel.

7. The invention as set forth in claim 1 where said members are of low thermal conductivity material.

8. The invention as set forth in claim 1 comprising multiple continuous elongated channels extending from one edge to an opposite edge of said first substrate and integral members extending across each of said multiple elongated channels.

9. The invention as set forth in claim 1 including two integral members each mounting one of said temperature sensors and a third integral member between said two members and spaced therefrom for mounting said means for heating said fluid.

10. The invention as set forth in claim 9 in which said three members include means for forming resistive patterns thereon forming said sensors and said heating means.

11. The invention as set forth in claim 1 wherein said first substrate comprises a first panel including said channel and said integral members and a second panel having an elongated channel corresponding to said channel of said first panel, said panels being bonded together such that said integral members bisect a flow path formed by said corresponding channels.

12. A thermal mass flow meter comprising:
   a flow conduit;
   a flow-splitting substrate member extending transversely across a portion of said conduit and containing active flow sensors;
   means for providing passive by-pass fluid flow paths in said conduit;
   said substrate member including:
      means for forming an elongated channel extending from one edge of the substrate member to an opposite edge of the substrate member;
      means for forming a first temperature-sensing member integral with said substrate member extending transversely across said channel;
      a second temperature-sensing member on said substrate member; and
      means in the channel for differentially heating at least one of said first and second temperature-sensing members to indicate the flow rate of said fluid by comparison with output signals from said first and second temperature sensing members.

13. The invention as set forth in claim 12 in which said substrate member extends bilaterally across said conduit.

14. The invention as set forth in claim 12 including multiple elongated active channels in said substrate member, each of such channels situated in a common plane, multiple ones of said channels including a first temperature-sensing member and said means to differentially heat said first temperature-sensing member, such that multiple readings of fluid flow rate are obtained across said conduit.

15. The invention as set forth in claim 14, further including:
   means for monitoring the flow rate in each channel; and
   means for disregarding a low flow rate sensing reading in a channel indicative of an obstructed channel.

16. The invention as set forth in claim 12 including multiple substrate members extending in parallelism across said conduit, each substrate member having multiple active channels containing said flow measuring differential temperature sensors therein.

17. A thermal mass flow meter for fluids comprising:
   a substrate;
   a continuous elongated flow channel having side walls and a bottom extending on a surface of said substrate from one edge of the substrate to an opposed edge of the substrate;
   a membrane having a top side and under side and being integral with said substrate, said membrane extending transversely across at least a portion of said channel and spaced from said channel bottom such that fluid passes through said channel transversely of and parallel to both the top side and under side of said membrane;
   a first temperature sensor on said membrane;
   a second temperature sensor on said substrate spaced from said first temperature sensor; and
   means for heating at least one of said first and second temperature sensors to provide a temperature difference between said first temperature sensor and said second temperature sensor indicative of mass fluid flow.

18. The flow meter as set forth in claim 17 in which said membrane bisects said channel.

19. The flow meter as set forth in claim 17 in which said substrate comprises:
   a first substrate including a first flow groove having side walls extending into said first substrate, said first flow groove extending from one edge to an opposite edge of the first substrate, said membrane integrally extending transversely of said first flow groove bridging said side walls; and a second substrate coextensive with said first substrate and including a second flow groove extending from one edge to an opposite edge of the second substrate, said second substrate being connectedly sealed to said first substrate such that the said first flow groove and second flow groove are in face-to-face relation and said membrane divides an overall channel formed by said facing first and second flow grooves.

20. A thermal mass flow meter for fluids comprising a substrate;

an elongated channel extending on a surface of said substrate for conveying a fluid, said substrate having at least two integral members spaced from each other and extending transversely across at least a portion of said channel;

means for forming a temperature sensor on said of said members;

means in said channel for heating said fluid to provide a temperature difference between said sensors when fluid is being conveyed; and wherein said substrate comprises a first element including said channel and said integral members and a second element having an elongated channel corresponding to said channel on said first element said elements being bonded together whereby said integral members divide a flow path formed by said corresponding channels.

* * * * *

UNITED STATES PATENT AND TRADEMARK OFFICE
CERTIFICATE OF CORRECTION

PATENT NO. : 4,542,650

DATED : September 24, 1985

INVENTOR(S) : Renken et al.

It is certified that error appears in the above—identified patent and that said Letters Patent is hereby corrected as shown below:

Col. 7, line 46, change "44-44" to --41-44--.

Col. 7, line 63, delete "(" before "if".

Col. 10, line 61, change "them" to --then--.

Col. 14, line 3, change "said" to --each--.

Signed and Sealed this

Fourth Day of March 1986

[SEAL]

Attest:

DONALD J. QUIGG

Attesting Officer

Commissioner of Patents and Trademarks